(12) United States Patent
Ma et al.

(10) Patent No.: US 11,747,454 B2
(45) Date of Patent: Sep. 5, 2023

(54) GRANULARITY-FLEXIBLE EXISTENCE-BASED OBJECT DETECTION

(71) Applicant: CYNGN, INC., Menlo Park, CA (US)

(72) Inventors: Biao Ma, Sunnyvale, CA (US); Lior Tal, San Diego, CA (US)

(73) Assignee: CYNGN, INC., Menlo Park, CA (US)

( * ) Notice: Subject to any disclaimer, the term of this patent is extended or adjusted under 35 U.S.C. 154(b) by 0 days.

(21) Appl. No.: 17/808,053

(22) Filed: Jun. 21, 2022

(65) Prior Publication Data
US 2022/0406014 A1    Dec. 22, 2022

Related U.S. Application Data

(60) Provisional application No. 63/366,738, filed on Jun. 21, 2022, provisional application No. 63/213,132,
(Continued)

(51) Int. Cl.
| | | |
|---|---|---|
| *G01S 17/89* | (2020.01) | |
| *G01S 7/497* | (2006.01) | |
| *G01S 17/86* | (2020.01) | |
| *H04L 7/00* | (2006.01) | |
| *G01S 7/4913* | (2020.01) | |
| *G01S 17/931* | (2020.01) | |

(Continued)

(52) U.S. Cl.
CPC ............ *G01S 7/497* (2013.01); *G01S 7/4876* (2013.01); *G01S 7/4913* (2013.01); *G01S 17/86* (2020.01); *G01S 17/89* (2013.01); *G01S 17/931* (2020.01); *G06T 17/20* (2013.01); *G06T 19/20* (2013.01); *H04L 7/0041* (2013.01); *H04N 23/951* (2023.01); *G06T 2219/2016* (2013.01)

(58) Field of Classification Search
None
See application file for complete search history.

(56) References Cited

U.S. PATENT DOCUMENTS

2017/0337704 A1 * 11/2017 Williams .......... G06K 7/10544
2021/0199799 A1 *  7/2021 Taalimi ................ G01S 17/06
(Continued)

FOREIGN PATENT DOCUMENTS

| CN | 106127771 | * 11/2018 | .............. G06T 7/00 |
| TW | I745204 | * 11/2021 | ............. G01S 17/88 |
| WO | WO-2022190364 A1 * 9/2022 | | |

OTHER PUBLICATIONS

PCT International Search Report and Written Opinion issued in corresponding application No. PCT/US2022/034398, dated Sep. 6, 2022.

*Primary Examiner* — Andrew G Yang
(74) *Attorney, Agent, or Firm* — Maschoff Brennan (57) ABSTRACT

A method may include obtaining sensor data from one or more LiDAR units and determining a point-cloud corresponding to the sensor data obtained from each respective LiDAR unit. The method may include aggregating the point-clouds as an aggregated point-cloud. A number of data points included in the aggregated point-cloud may be decreased by filtering out one or more of the data points according to one or more heuristic rules to generate a reduced point-cloud. The method may include determining an operational granularity level for the reduced point-cloud. An array of existence-based objects may be generated based on the reduced point-cloud and the operational granularity level.

17 Claims, 7 Drawing Sheets

Related U.S. Application Data filed on Jun. 21, 2021, provisional application No. 63/213,131, filed on Jun. 21, 2021, provisional application No. 63/213,130, filed on Jun. 21, 2021.

(51) Int. Cl.
*G01S 7/487* (2006.01)
*G06T 17/20* (2006.01)
*G06T 19/20* (2011.01)
*H04N 23/951* (2023.01)

(56) References Cited

U.S. PATENT DOCUMENTS

2021/0253131 A1\* 8/2021 Sen .......................... G01S 17/58
2022/0128700 A1\* 4/2022 Saranin ................... G06T 7/162

\* cited by examiner

GRANULARITY-FLEXIBLE EXISTENCE-BASED OBJECT DETECTION

CROSS-REFERENCE TO RELATED APPLICATIONS

This application claims the benefit of U.S. Patent Application Ser. No. 63/213,130, filed on Jun. 21, 2021, U.S. Patent Application Ser. No. 63/213,131, filed on Jun. 21, 2021, and U.S. Patent Application Ser. No. 63/213,132, filed on Jun. 21, 2021, and U.S. Patent Application Ser. No. 63/366,738, filed on Jun. 21, 2022; the disclosures of which are incorporated herein by reference in their entireties.

FIELD OF THE INVENTION

The present disclosure generally relates to a system and method of granularity-flexible existence-based object detection, which may include a performance boost based on heuristics.

BACKGROUND

An autonomous vehicle may scan an environment in which the autonomous vehicle is located using one or more sensors positioned on and/or around the autonomous vehicle. The autonomous vehicle may detect objects based on data collected by the sensors and avoid objects in a path of travel of the autonomous vehicle based on the detected objects.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a method may include obtaining sensor data from one or more LiDAR units and determining a point-cloud corresponding to the sensor data obtained from each respective LiDAR unit. The method may include aggregating the point-clouds as an aggregated point-cloud. A number of data points included in the aggregated point-cloud may be decreased by filtering out one or more of the data points according to one or more heuristic rules to generate a reduced point-cloud. The method may include determining an operational granularity level for the reduced point-cloud. An array of existence-based objects may be generated based on the reduced point-cloud and the operational granularity level.

In some embodiments, the point-cloud corresponding to the sensor data obtained from each respective LiDAR unit may be a four-dimensional matrix that includes x-position information, y-position information, z-position information, and reflection intensity information relating to each scanned point detected by the LiDAR units. In these and other embodiments, aggregating the point-clouds as the aggregated point-cloud may include performing one or more first matrix transformations to scale the four-dimensional matrix corresponding to each respective point-cloud and performing one or more second matrix transformations to rotate one or more four-dimensional matrices scaled by the first matrix transformations. In these and other embodiments, decreasing the number of data points included in the aggregated point-cloud according to the heuristic rules may include removing one or more data points corresponding to respective scanned points based on physical constraints relating to an environment from which the scanned points were detected by the LiDAR units. In these and other embodiments, the heuristic rules may include one or more rules for removing the data points based on at least one of the following: ground-level detection, boundary-level detection, and duplicate scanned point detection.

In some embodiments, the method may further comprise determining an operational granularity level for the reduced point-cloud. Generating the array of existence-based objects may be based on the operational granularity level and determining the operational granularity level for the reduced point-cloud may include setting a preliminary granularity level that indicates a minimum granularity block size based on a computational capacity of a computer system configured to analyze the reduced point-cloud and iteratively increasing the preliminary granularity level by an incremental block size until reaching the operational granularity level in which the operational granularity level provides a resolution that allows identification of one or more of the existence-based objects in the aggregated point-cloud.

In some embodiments, the method may further comprise determining an operational granularity level for the reduced point-cloud. Generating the array of existence-based objects may be based on the operational granularity level and determining the operational granularity level for the reduced point-cloud may include setting a preliminary granularity level that indicates a maximum granularity block size based on a computational capacity of a computer system configured to analyze the reduced point-cloud and iteratively decreasing the preliminary granularity level by a decremental block size until reaching the operational granularity level in which the operational granularity level provides a resolution that allows identification of one or more of the existence-based objects in the aggregated point-cloud.

According to an aspect of an embodiment, one or more non-transitory computer-readable storage media may be configured to store instructions that, in response to being executed, cause a system to perform operations. The operations may include obtaining sensor data from one or more LiDAR units and determining a point-cloud corresponding to the sensor data obtained from each respective LiDAR unit. The operations may include aggregating the point-clouds as an aggregated point-cloud. A number of data points included in the aggregated point-cloud may be decreased by filtering out one or more of the data points according to one or more heuristic rules to generate a reduced point-cloud. The operations may include determining an operational granularity level for the reduced point-cloud. An array of existence-based objects may be generated based on the reduced point-cloud and the operational granularity level.

In some embodiments, the point-cloud corresponding to the sensor data obtained from each respective LiDAR unit may be a four-dimensional matrix that includes x-position information, y-position information, z-position information, and reflection intensity information relating to each scanned point detected by the LiDAR units. In these and other embodiments, aggregating the point-clouds as the aggregated point-cloud may include performing one or more first matrix transformations to scale the four-dimensional matrix corresponding to each respective point-cloud and performing one or more second matrix transformations to rotate one or more four-dimensional matrices scaled by the first matrix transformations. In these and other embodiments, decreasing the number of data points included in the aggregated point-cloud according to the heuristic rules may include removing one or more data points corresponding to respective scanned points based on physical constraints relating to an environment from which the scanned points were detected by the LiDAR units. In these and other embodiments, decreasing the number of data points included in the aggregated point-cloud according to the heuristic rules may include removing one or more data points corresponding to respective scanned points based on physical constraints relating to an environment from which the scanned points were detected by the LiDAR units, and the heuristic rules may include one or more rules for removing the data points based on at least one of the following: ground-level detection, boundary-level detection, and duplicate scanned point detection.

In some embodiments, the operations may further comprise determining an operational granularity level for the reduced point-cloud. Generating the array of existence-based objects may be based on the operational granularity level and determining the operational granularity level for the reduced point-cloud may include setting a preliminary granularity level that indicates a minimum granularity block size based on a computational capacity of a computer system configured to analyze the reduced point-cloud and iteratively increasing the preliminary granularity level by an incremental block size until reaching the operational granularity level in which the operational granularity level provides a resolution that allows identification of one or more of the existence-based objects in the aggregated point-cloud.

In some embodiments, the operations may further comprise determining an operational granularity level for the reduced point-cloud. Generating the array of existence-based objects may be based on the operational granularity level and determining the operational granularity level for the reduced point-cloud may include setting a preliminary granularity level that indicates a maximum granularity block size based on a computational capacity of a computer system configured to analyze the reduced point-cloud and iteratively decreasing the preliminary granularity level by a decremental block size until reaching the operational granularity level in which the operational granularity level provides a resolution that allows identification of one or more of the existence-based objects in the aggregated point-cloud.

According to an aspect of an embodiment, a system may include one or more processors and one or more non-transitory computer-readable storage media configured to store instructions that, in response to being executed, cause the system to perform operations. The operations may include obtaining sensor data from one or more LiDAR units and determining a point-cloud corresponding to the sensor data obtained from each respective LiDAR unit. The operations may include aggregating the point-clouds as an aggregated point-cloud. A number of data points included in the aggregated point-cloud may be decreased by filtering out one or more of the data points according to one or more heuristic rules to generate a reduced point-cloud. The operations may include determining an operational granularity level for the reduced point-cloud. An array of existence-based objects may be generated based on the reduced point-cloud and the operational granularity level.

In some embodiments, the point-cloud corresponding to the sensor data obtained from each respective LiDAR unit may be a four-dimensional matrix that includes x-position information, y-position information, z-position information, and reflection intensity information relating to each scanned point detected by the LiDAR units. In these and other embodiments, aggregating the point-clouds as the aggregated point-cloud may include performing one or more first matrix transformations to scale the four-dimensional matrix corresponding to each respective point-cloud and performing one or more second matrix transformations to rotate one or more four-dimensional matrices scaled by the first matrix transformations. In these and other embodiments, decreasing the number of data points included in the aggregated point-cloud according to the heuristic rules may include removing one or more data points corresponding to respective scanned points based on physical constraints relating to an environment from which the scanned points were detected by the LiDAR units. In these and other embodiments, decreasing the number of data points included in the aggregated point-cloud according to the heuristic rules may include removing one or more data points corresponding to respective scanned points based on physical constraints relating to an environment from which the scanned points were detected by the LiDAR units, and the heuristic rules may include one or more rules for removing the data points based on at least one of the following: ground-level detection, boundary-level detection, and duplicate scanned point detection.

In some embodiments, the operations may further comprise determining an operational granularity level for the reduced point-cloud. Generating the array of existence-based objects may be based on the operational granularity level and determining the operational granularity level for the reduced point-cloud may include setting a preliminary granularity level that indicates a minimum granularity block size based on a computational capacity of a computer system configured to analyze the reduced point-cloud and iteratively increasing the preliminary granularity level by an incremental block size until reaching the operational granularity level in which the operational granularity level provides a resolution that allows identification of one or more of the existence-based objects in the aggregated point-cloud.

The object and advantages of the embodiments will be realized and achieved at least by the elements, features, and combinations particularly pointed out in the claims. It is to be understood that both the foregoing general description and the following detailed description are explanatory and are not restrictive of the invention, as claimed.

BRIEF DESCRIPTION OF THE DRAWINGS

Example embodiments will be described and explained with additional specificity and detail through the accompanying drawings in which.

DETAILED DESCRIPTION

An autonomous driving system may facilitate autonomous operation of an automobile or any other vehicle with limited or no action from a driver or a passenger of the vehicle. Operation of a fully autonomous driving system may entail collecting large amounts of data from an environment surrounding the autonomous driving system such that the autonomous driving system may perform various computations that facilitate the autonomous operation of the vehicle. The autonomous driving system may include a suite of on-vehicle sensors that are involved in collecting information regarding the autonomous vehicle's surroundings. The autonomous driving system may use the sensed data to identify objects in the vicinity of the autonomous vehicle. The autonomous driving system may include a mapping system and a localization system that are respectively configured to generate a virtual map and determine a position of the autonomous vehicle with respect to the virtual map based on the collected sensor data. The autonomous driving system may then predict the movement and/or the trajectory of one or more of the detected objects and make driving decisions based on any of the present location of the autonomous vehicle, an intended destination, the detected positions and/or predicted trajectories of nearby objects, and/or one or more driving rules that apply to the autonomous vehicle. The driving decisions may be sent to a control system for the autonomous vehicle, which may direct the operation of the autonomous vehicle, resulting in the autonomous vehicle being "driven" or operated in the automated manner. Such direction and/or control may be performed by a drive-by-wire system in communication with the autonomous vehicle via a drive-by-wire abstraction system.

The present disclosure may relate to, among other things, object detection based on light detection and ranging (LiDAR) data obtained by one or more LiDAR units positioned on and/or around a vehicle. The object-detection process may include generating an array of existence-based objects by processing the LiDAR data. In some embodiments, processing the LiDAR data may include aligning LiDAR data obtained from one or more LiDAR units positioned in various orientations and/or elevations. Additionally or alternatively, processing the LiDAR data may include removing one or more data points based on heuristic filtering of the LiDAR data. A granularity of the array of existence-based objects may be adjusted to facilitate more accurate and/or more efficient analysis of the objects included in the array of existence-based objects.

Embodiments of the present disclosure will be explained with reference to the accompanying drawings.

Figure 1:
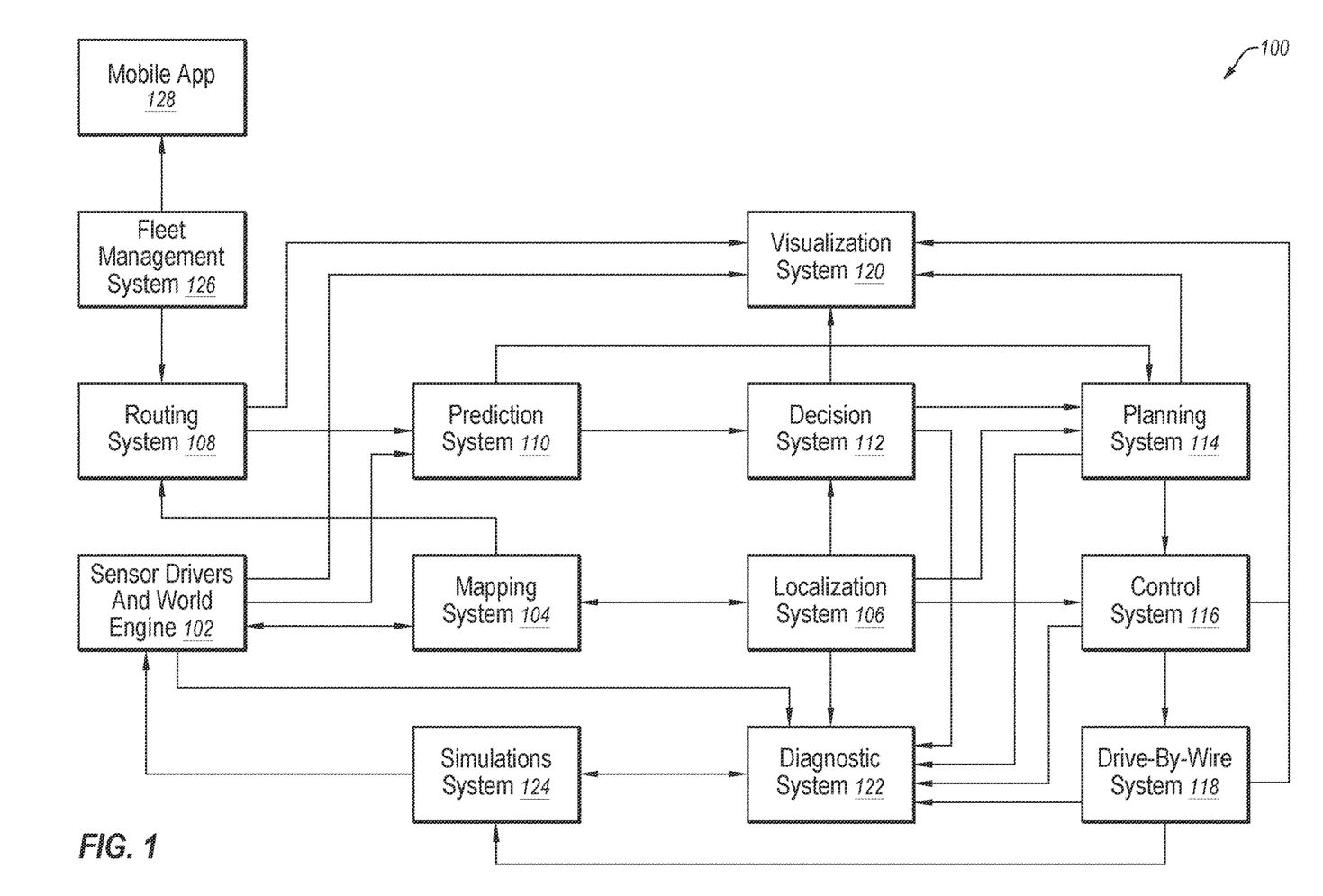
FIG. 1 illustrates an example embodiment of an autonomous driving system according to at least one embodiment of the present disclosure.

FIG. 1 illustrates an example embodiment of an autonomous driving system 100 according to at least one embodiment of the present disclosure. The autonomous driving system 100 may include one or more computer systems and/or software modules configured to perform one or more operations involved with driving an autonomous vehicle. Various aspects of the autonomous driving system 100 may be included on-board with the autonomous vehicle itself, or with a remote system in communication with the autonomous vehicle, such as a cloud computing system, a server, or a mobile device. In some embodiments, the autonomous driving system 100 may include sensor drivers and a world engine 102 that is configured to capture and process sensor data relating to an environment in which the autonomous vehicle travels, such as information relating to what objects are present in the environment and where such objects are located relative to the autonomous vehicle. The sensor data related to the autonomous vehicle's environment may be sent to a mapping system 104 to generate a virtual map of the environment. In some embodiments, the virtual map may be sent from the mapping system 104 back to the sensor drivers and world engine 102 to provide a map on which the sensor data relating to environmental objects may be oriented. Additionally or alternatively, the virtual map may provide a map onto which environmental topography may be plotted.

The virtual map of the mapping system 104 may be sent to a localization system 106 and/or a routing system 108. The localization system 106 may provide an estimated location of the autonomous vehicle within the environment and/or the virtual map, and the routing system 108 may compute a route between the estimated location of the autonomous vehicle to a designated destination along a valid path included in the virtual map.

In some embodiments, the sensor data of the sensor drivers and world engine 102 may be sent to a prediction system 110 that is configured to predict movement and/or trajectories of one or more objects in the vicinity of the autonomous vehicle and/or the autonomous vehicle itself. A decision system 112 may obtain the predicted object trajectories from the prediction system 110, and based on a location of the autonomous vehicle as determined by the localization system 106, the decision system 112 may determine one or more driving decisions according to various driving rules. The driving decisions determined by the decision system 112 may be sent to a planning system 114 that processes, parses, and/or queues the driving decisions for a downstream control system 116. In some embodiments, the control system 116 may generate control signals that are obtained by a drive-by-wire system 118 or another actuation system that controls one or more operations of the autonomous vehicle.

In some embodiments, the autonomous driving system 100 may include a visualization system 120 that is configured to obtain information from the sensor drivers and world engine 102, the prediction system 110, the decision system 112, the planning system 114, the control system 116, the drive-by-wire system 118, or any other computer system of the autonomous driving system 100. The visualization system 120 may generate two-dimensional and/or three-dimensional models of the autonomous vehicle, objects in the vicinity of the autonomous vehicle, and/or the environment in which the autonomous vehicle operates. Additionally or alternatively, the visualization system 120 may provide a visual representation of movement and/or predicted trajectories of the autonomous vehicle and/or any of the nearby objects.

In some embodiments, the autonomous driving system 100 may include a diagnostics system 122 that is configured to obtain information from the sensor drivers and world engine 102, the prediction system 110, the decision system 112, the planning system 114, the control system 116, the drive-by-wire system 118, or any other computer system of the autonomous driving system 100. The diagnostics system 122 may run diagnostic tests to assess the accuracy and/or validity of determinations and decisions made by other computer systems of the autonomous driving system 100.

In these and other embodiments, the diagnostics system 122 may be communicatively coupled to a simulations system 124 that provides a virtual environment in which the determinations and decisions made by other computer systems and/or software modules of the autonomous driving system 100 may be simulated to identify any issues with the simulated determinations and decisions. Additionally or alternatively, the simulations system 124 may obtain information from the drive-by-wire system 118 so that the simulations system 124 may run simulations based on control signals implemented by the autonomous vehicle in the real world. The simulations system 124 may virtually determine movements of the autonomous vehicle and/or of one or more objects in the vicinity of the autonomous vehicle. Based on the virtually determined movements, the simulations system 124 may determine updated positions of the autonomous vehicle and/or of the surrounding objects. In some embodiments, the simulations system 124 may provide the virtually determined movements and/or the updated positions to the sensor drivers and world engine 102 so that the total measurable world as represented by the sensor drivers and world engine 102 may be updated based on the simulation results.

In some embodiments, the autonomous driving system 100 may include a fleet management system 126 that obtains information from multiple autonomous vehicles communicatively coupled to the fleet management system 126. The fleet management system 126 may relay information between different autonomous vehicles in communication with the fleet management system 126 to coordinate operations of the multiple autonomous vehicles. In these and other embodiments, a user managing fleet operations may use a mobile app 128 to receive information from and/or send information or commands to a fleet of autonomous vehicles.

Modifications, additions, or omissions may be made to the autonomous driving system 100 without departing from the scope of the present disclosure. For example, the designations of different elements in the manner described is meant to help explain concepts described herein and is not limiting. For instance, in some embodiments, the graphing module 120 and the quadratic computation module 130 are delineated in the specific manner described to help with explaining concepts described herein but such delineation is not meant to be limiting. Further, the autonomous driving system 100 may include any number of other elements or may be implemented within other systems or contexts than those described.

Figure 2:
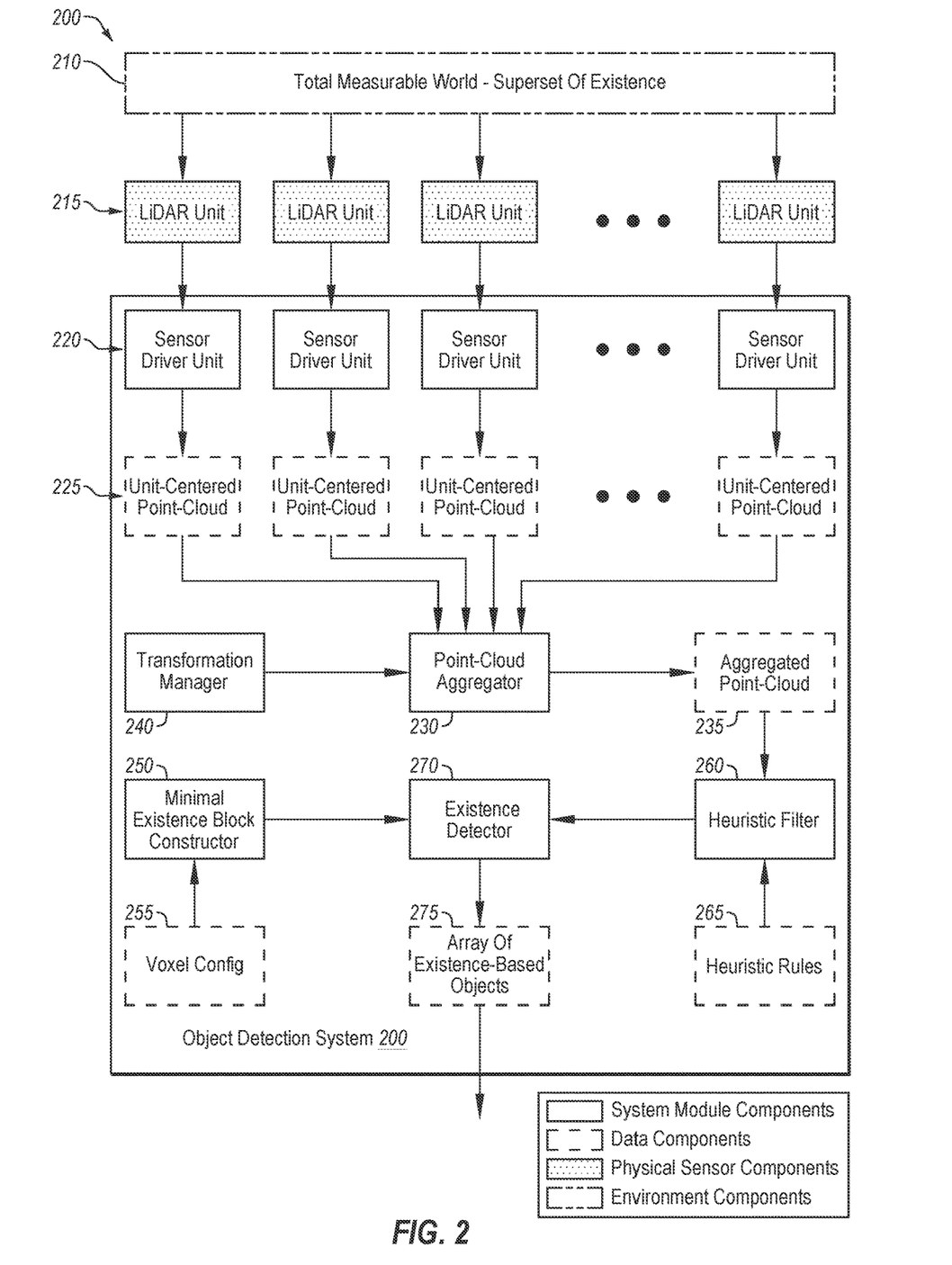
FIG. 2 illustrates an example embodiment of an object-detection system according to at least one embodiment of the present disclosure.

FIG. 2 illustrates an example embodiment of an environment 200 within which an object-detection system 205 operates, according to one or more embodiments of the present disclosure. The object-detection system 205 may include sensor driver units 220 that generate point-clouds 225 centered around a corresponding LiDAR unit 215 from which sensor data is obtained. The object-detection system 205 may include a point-cloud aggregator 230, a transformation manager 240, a minimal existence block constructor 250, a heuristic filter 260, and/or an existence detector 270. In some embodiments, the LiDAR units 215 may include physical sensor components mounted to an autonomous vehicle (an example of which is illustrated in total measurable world 300 in FIG. 3 below) that capture information relating to topography, terrain, objects, or any other aspects of a total measurable world 210 around the autonomous vehicle. In some embodiments, the point-cloud aggregator 230, the transformation manager 240, the minimal existence block constructor 250, the heuristic filter 260, and the existence detector 270 may include software modules associated with a computer system, such as the object-detection system 205. In these and other embodiments, unit-centered point-clouds 225, an aggregated point-cloud 235, a voxel config 255, heuristic rules 265, and/or an array of existence-based objects 275 may include data that may be input to and/or output from one or more of the software modules described above.

Elements of the object-detection system 205, including, for example, the point-cloud aggregator 230, the transformation manager 240, the minimal existence block constructor 250, the heuristic filter 260, and the existence detector 270 (generally referred to as "computing modules"), may include code and routines configured to enable a computing system to perform one or more operations. Additionally or alternatively, the computing modules may be implemented using hardware including a processor, a microprocessor (e.g., to perform or control performance of one or more operations), a field-programmable gate array (FPGA), or an application-specific integrated circuit (ASIC). In some other instances, the computing modules may be implemented using a combination of hardware and software. In the present disclosure, operations described as being performed by the computing modules may include operations that the computing modules may direct one or more corresponding systems to perform. The computing modules may be configured to perform a series of operations with respect to the unit-centered point-clouds 225, the aggregated point-cloud 235, the voxel config 255, the heuristic rules 265, and/or the array of existence-based objects 275 as described in further detail below in relation to method 400 of FIG. 4, method 500 of FIG. 5, and/or method 600 of FIG. 6.

Figure 3:
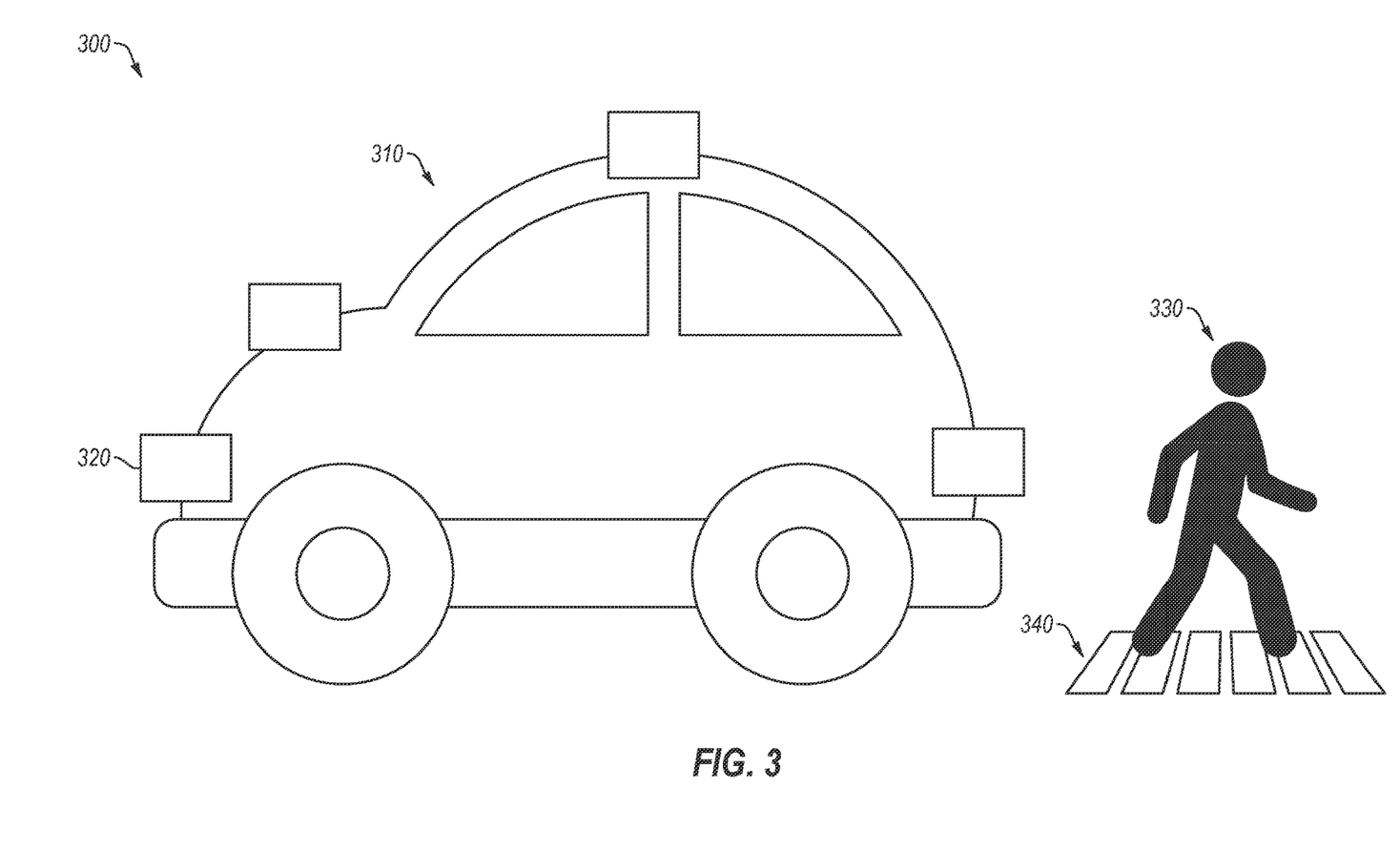
FIG. 3 illustrates an autonomous vehicle with LiDAR sensor units positioned on the autonomous vehicle in which the LiDAR sensor units are configured to capture LiDAR data representative of a total measurable world around the LiDAR sensor units according to at least one embodiment of the present disclosure.

As illustrated in FIG. 3, one or more LiDAR units 320, which may be the same as or similar to the LiDAR units 215 of FIG. 2, may be positioned on an autonomous vehicle 310 and configured to capture LiDAR data that is representative of a total measurable world 300 around the LiDAR units 320 as perceived by the LiDAR units 320. The total measurable world 300 may include one or more objects 330 within the detection range of the LiDAR units 320. In some embodiments, the LiDAR data generated by a given LiDAR unit 320 may include a topography 340 of that portion of the total measurable world 300 that is within the range of the given LiDAR unit 320, and detection of the objects 330 in the total measurable world 300 may be based on changes in the sensed topography 340. For example, sudden increases in the topography 340, sudden decreases in the topography 340, unnatural topographical contouring (e.g., very straight edges, orderly polygonal shapes, or repeating topography), and/or some combination thereof may be identified as the objects 330 in the total measurable world 300. Additionally or alternatively, the LiDAR data may include a distance from the autonomous vehicle 310 to each of the detected objects 330 or other topographical features based on measuring the time for reflected light to return to the LiDAR units 320. Additionally or alternatively, the LiDAR units 320 may be configured to measure an intensity of reflected light returning to the LiDAR units 320. As used herein, the topography 340 may refer to characteristics of a plane or surface representative of a collection of points of LiDAR data, such as relative elevation changes in the plane or surface, which may correspond to features included in the total measurable world 300, such as a crosswalk or other part of a road as illustrated in FIG. 3.

Returning to the description of FIG. 2, the LiDAR data captured by a given LiDAR unit 215 may be represented as a unit-centered point-cloud 225 by the sensor driver unit 220 corresponding to the given LiDAR unit 215. In some embodiments, the unit-centered point-cloud 225 may include an array of three-dimensional points that represent the LiDAR data captured by each of the LiDAR units 215. For example, each of the unit-centered point-clouds 225 may include three-dimensional points that correspond to the detection range of corresponding LiDAR units 215, and one or more three-dimensional points within the unit-centered point-clouds 225 may correspond to objects detected by the LiDAR units 215.

In some embodiments, the unit-centered point-clouds 225 may be represented by a matrix in which each point in the total measurable world 210 as sensed or scanned by each of the LiDAR units 215 is represented by a row or a column in the matrix. For example, the aforementioned three-dimensional points of the unit-centered point-clouds 225 may include x-position, y-position, and z-position information of each scanned point to quantitatively describe the location of the scanned points relative to the respective LiDAR unit 215 that scanned the point. In this and other examples, the matrix may include a number of rows or columns corresponding to the number of scanned points, and each row or column of the matrix may include three elements in which a first element represents the x-position, a second element represents the y-position, and a third element represents the z-position of each scanned point. As such, the matrix may include n rows corresponding to n total scanned points by the LiDAR units 215 and three columns of position information or n columns corresponding to the n total scanned points and three rows of position information.

Additionally or alternatively, the matrix representing the LiDAR data may quantitatively represent an intensity of reflected light captured by the LiDAR units 215 for each of the scanned points. Reflection intensity may provide information regarding the material of a given scanned point. Scanned points having darker colors may be associated with lower reflection intensity, while scanned points having more vibrant or lighter colors may be associated with higher reflection intensity. The reflection intensity may additionally or alternatively provide information regarding a composition of a given material. For example, clothing, skin, and hair associated with a pedestrian may be associated with lower reflection intensity, while metal or plastic associated with vehicles, roadside structures, or road signage may be associated with higher reflection intensity.

In some embodiments, the reflection intensity associated with each of the scanned points may be represented as a fourth element alongside x-position, y-position, and z-position information corresponding to each scanned point. For example, the matrix may be represented mathematically as follows:

$$\begin{bmatrix} 5 & 4 & 23 & I_1 \\ \vdots & \ddots & \ddots & \vdots \\ 19 & -4 & 12 & I_n \end{bmatrix}$$

In the example matrix, each row of the matrix may represent one of the scanned points. Each row of the matrix may include a first value (e.g., in the first column of each row) indicating the x-position of the corresponding scanned point, a second value (e.g., in the second column of each row) indicating the y-position of the corresponding scanned point, a third value (e.g., in the third column of each row) indicating the z-position of the corresponding scanned point. Additionally or alternatively, each row of the example matrix may include a fourth value, such as intensity values $I_1, \ldots,$ and/or $I_n$ in the fourth column of each row that corresponds to an intensity of reflected light corresponding to respective scanned points.

Because each of the LiDAR units 215 may be positioned and/or oriented independent of each other LiDAR unit 215, the position information captured by each LiDAR unit 215 may be quantitatively represented by a coordinate system unique to each respective LiDAR unit 215. In other words, the unit-centered point-clouds 225 corresponding to each of the LiDAR units 215 may be misaligned relative to one another because each LiDAR unit 215 is positioned in a different location relative to one another. Additionally or alternatively, the point-cloud captured by a given LiDAR unit 215 may represent a subset of the total measurable world 210. In some embodiments, the unit-centered point-clouds 225 may be aggregated by the point-cloud aggregator 230 to generate an aggregated set of point-clouds 235 representative of the total measurable world 210. In some embodiments, the aggregated set of point-clouds 235 may include a three-dimensional array describing positional intensity (e.g., intensity along an x-axis, a y-axis, and/or a z-axis) of some or all of the scanned points represented by each of the unit-centered point-clouds 225.

In some embodiments, the point-cloud aggregator 230 may apply one or more matrix transformations to the three-dimensional points in which the matrix transformations adjust the alignment of one or more of the unit-centered point-clouds 225 based on a configurable transformation (TF)-tree structure of transformation. The TF-tree structure of transformation may involve setting a center point at some location near, on, and/or in the autonomous vehicle and one or more intermediate points near, on, and/or in the autonomous vehicle. Each of the unit-centered point-clouds 225 may be paired with one of the intermediate points, and a matrix transformation may be applied to the unit-centered point-clouds 225 to move and/or orient the unit-centered point-clouds 225 to their paired intermediate points. In some embodiments, the matrix transformations may include scaling (e.g., multiplying one or more elements of the matrices representing the unit-centered point-clouds 225 by a given value, adding, and/or subtracting elements of the matrices by a given value, or some combination thereof) and/or rotating the unit-centered point-clouds 225 based on the location and orientation of the unit-centered point-clouds 225 relative to their paired intermediate points. After moving and/or orienting the unit-centered point-clouds 225 to their paired intermediate points, a second matrix transformation may be applied to each of the intermediate points to move and/or reorient the matrices at the intermediate points to the center point of the autonomous vehicle.

Using the TF-tree structure of transformation may provide numerous advantages over directly transforming each of the unit-centered point-clouds 225 to the center point of the autonomous vehicle. For example, applying matrix transformations via the TF-tree structure of transformation may preserve data precision during movement and/or reorientation of the unit-centered point-clouds 225 better than directly transforming each of the unit-centered point-clouds 225 to the center point because rounding issues may be avoided. As another example, computational speed may be increased and/or resource usage may be decreased because the computations being applied to the unit-centered point-clouds 225 via the TF-tree structure of transformation may be simpler than matrix transformations specifically tailored to each unit-centered point-cloud 225 for transforming to the center point. As another example, introducing new sensors to the autonomous vehicle may be easier under the TF-tree structure of transformation because a simple matrix transformation may be applied to the new sensors based on the intermediate points to which the new sensors are paired.

Additionally or alternatively, adjusting the alignment of the unit-centered point-clouds 225 may include changing one or more parameters corresponding to the centers and/or origins of the unit-centered point-clouds 225 within six degrees of freedom including at least one of: surge, heave, and/or sway for three-dimensional translation and/or pitch, yaw, and/or roll for three-dimensional orientation. Additionally or alternatively, the matrix transformations may include rescaling one or more parameters relative to the centers and/or origins of the unit-centered point-clouds 225 to resize the unit-centered point-clouds 225.

In some embodiments, the matrix transformation may identify an origin position of the system 205 to analyze the total measurable world 210 and the positions of the LiDAR units 215 from a consistent location. For example, a middle of a rear axle of an autonomous vehicle may be treated as the origin position while the LiDAR units 215 may be positioned at different locations than the middle of the rear axle. The matrix transformations may adjust the LiDAR data to be from the origin position as a common point of reference. In these and other embodiments, the transformation manager 240 may include a data storage of the matrix transformations applied to the LiDAR data by the point-cloud aggregator 230 (e.g., a different matrix transformation for each of the different LiDAR units 215). The point-cloud aggregator 230 may obtain one or more of the matrix transformations from the transformation manager 240 and apply the obtained matrix transformations to the unit-centered point-clouds 225 and concatenate the transformed point-clouds into one matrix to generate the aggregated point-cloud 235.

Figure 4:
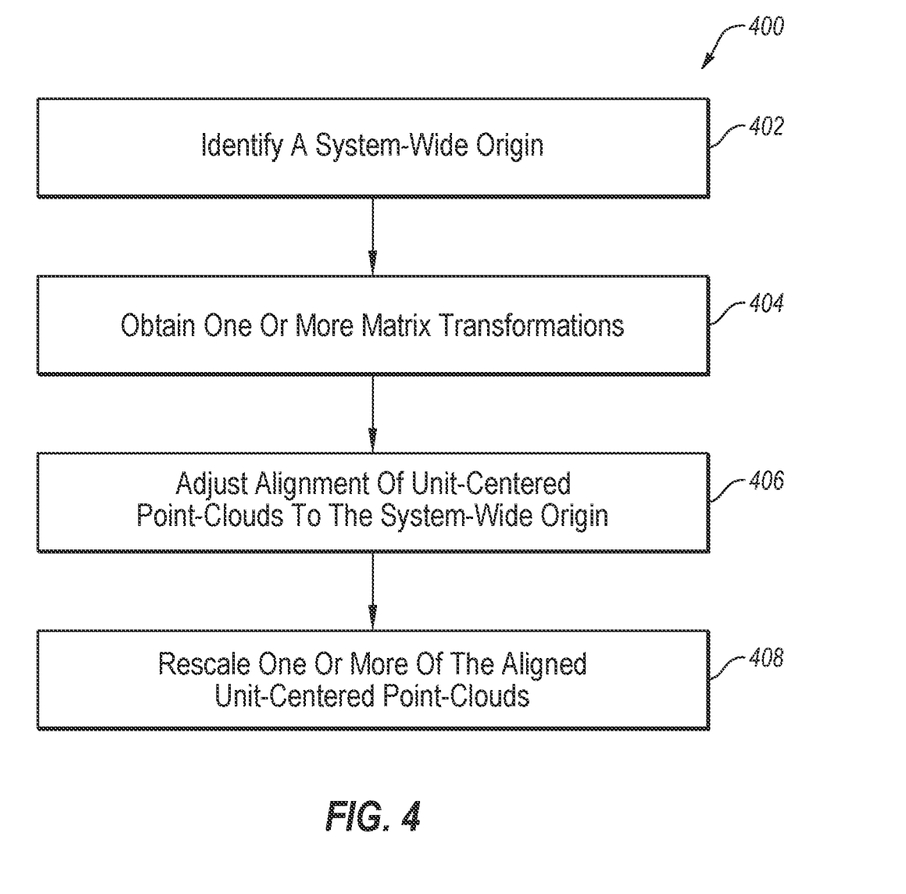
FIG. 4 is a flowchart of an example method of aligning multiple unit-centered point-clouds and generating an aggregated point-cloud according to at least one embodiment of the present disclosure.

FIG. 4 is a flowchart of an example method 400 of aligning multiple unit-centered point-clouds, such as the unit-centered point-clouds 225, and generating an aggregated point-cloud, such as the aggregated point-cloud 235, according to at least one embodiment of the present disclosure. The method 400 may be performed by any suitable system, apparatus, or device. For example, the object detection system 205, the sensor driver units 220, the point-cloud aggregator 230, the transformation manager 240, the minimal existence block constructor 250, the heuristic filter 260, and/or the existence detector 270 of FIG. 2 may perform one or more operations associated with the method 400. Although illustrated with discrete blocks, the steps and operations associated with one or more of the blocks of the method 400 may be divided into additional blocks, combined into fewer blocks, or eliminated, depending on the particular implementation.

The method 400 may begin at block 402, where a system-wide origin may be identified. In some embodiments, the system-wide origin may be a point located on and/or in an autonomous vehicle on which LiDAR sensors are mounted. The LiDAR data captured by the LiDAR sensors may be used to represent surroundings of the autonomous vehicle on which the LiDAR sensors are mounted. For example, the system-wide origin may be a center of mass of the autonomous vehicle, a driver's seat position in the autonomous vehicle, the middle of the rear axle, or some other point on, in, or near the autonomous vehicle.

At block 404, one or more matrix transformations may be obtained. The matrix transformations may include matrix computation templates that may be applied to a given matrix that represents a unit-centered point-cloud. The matrix computations templates may facilitate translating the given matrix to a different position based on a center point (e.g., the system-wide origin), rotating the given matrix, rescaling the given matrix, or any other adjustments to the given matrix.

At block 406, alignment of one or more unit-centered point-clouds may be adjusted based on the system-wide origin. In some embodiments, one or more of the matrix transformations obtained at block 404 may be applied to a given unit-centered point-cloud such that data points associated with the given unit-centered point-cloud are changed to represent a shift of the unit-centered point-cloud to the system-wide origin. In other words, the given unit-centered point-cloud, which may initially represent LiDAR data scanned from an origin point associated with a given LiDAR sensor, may be recentered, rotated, and/or otherwise transformed to correspond with the system-wide origin.

At block 408, one or more of the aligned point-clouds may be rescaled. Because translating and/or rotating a given unit-centered point-cloud may change how some data points associated with the given unit-centered point-cloud are interpreted, the aligned point-clouds may be rescaled to fix any such issues caused by application of the matrix transformations to the given unit-centered point-cloud.

Modifications, additions, or omissions may be made to the method 400 without departing from the scope of the disclosure. For example, the designations of different elements in the manner described is meant to help explain concepts described herein and is not limiting. Further, the method 400 may include any number of other elements or may be implemented within other systems or contexts than those described.

Returning to the description of FIG. 2, because each individual LiDAR unit 215 may only provide a limited field of view of the total measurable world 210, aligning the boundaries or overlapping features of the various unit-centered point-clouds 225 may provide a more holistic field of view of the total measurable world 210. Thus, generating the aggregated point-cloud 235 may involve determining which of the matrix transformations to apply to the unit-centered point-clouds 225 such that the unit-centered point-clouds 225 align with one another. In some embodiments, aggregating the unit-centered point-clouds 225 may involve aligning one or more of the unit-centered point-clouds 225 such that a boundary or another element of a first unit-centered point-cloud aligns with a corresponding boundary or another corresponding element of a second unit-centered point-cloud. In some embodiments, the relative positions and orientations of the LiDAR units 215 that captured the LiDAR sensor data corresponding to one or more given unit-centered point-clouds 225 may be used to facilitate determining a matrix transformation that may be applied to the given unit-centered point-clouds 225.

The aggregated point-cloud 235 may be obtained by the heuristic filter 260 to generate a reduced point-cloud according to one or more heuristic rules 265. Reducing the aggregated point-cloud may serve as a layer of protection for object-detection algorithms by simplifying calculations associated with the reduced point-cloud and/or improve computational efficiency by removing redundant data points. In some embodiments, the heuristic rules 265 may include metrics representing physical and/or practical constraints of the total measurable world 210 relevant to a system utilizing the object-detection system 205. For example, the heuristic rules 265 may include removal of any points in the aggregated point-cloud below a first given elevation (e.g., less than a first given z-value) in which the first given elevation represents a ground level and/or a floor level. As another example, the heuristic rules 265 may include removal of any points above a second given elevation (e.g., greater than a second given z-value) and/or outside of a horizontal boundary (e.g., greater than a first given y-value and/or less than a second given y-value) in which objects above the second given elevation and/or outside of the horizontal boundary are unlikely to affect driving of the vehicle. As another example, the heuristic rules 265 may include removal of data points including higher intensities relative to other data points included in the same aggregated point-cloud because high-intensity data points may represent redundant data points observed by multiple LiDAR units 215. In these and other embodiments, the heuristic rules 265 may be generated by a user such as a developer of the system. Additionally or alternatively, the heuristic rules 265 may be organically determined, such as by a machine-learning or artificial intelligence system, based on patterns in the sensor data captured by the LiDAR units 215. For example, multiple scanned points having the same or similar reflection intensity values at approximately similar z-positions may be identified as the ground level, and any scanned points having z-positions below that particular z-position may be filtered out by a heuristic rule relating to the ground level.

The existence detector 270 may generate an array of existence-based objects 275 in the total measurable world 210 based on the reduced point-cloud in which the array of existence-based objects 275 represents the objects detected within the total measurable world 210. In some embodiments, the minimal existence block constructor 250 may set an expected granularity of the array of existence-based objects 275 based on a size of a minimum block, which may facilitate control of a resolution of the array of existence-based objects 275. In other words, such a feature may set the threshold of granularity within which objects may be identified and treated as blocks of the corresponding size. Setting a small size for the minimum block (e.g., 10 cm by 10 cm) may provide high-resolution existence-based objects, while setting a large size for the minimum block (e.g., 50 cm by 50 cm, 100 cm by 100 cm, etc.) may reduce the resolution of the existence-based objects but improve the efficiency and/or speed of computational processes involving the array of existence-based objects 275. In these and other embodiments, a user may adjust the voxel configuration 255 (illustrated as "Voxel Config 255" in FIG. 2) to control a voxel representing the size of the minimum block.

In some embodiments, the object-detection system 205 may be configured to determine an operational granularity level specific to a computer system that implements the object-detection system 205. For example, the operational granularity level may be determined as described below in relation to the description of an example method 500 of FIG. 5.

Modifications, additions, or omissions may be made to the environment 200 and/or the object-detection system 205 without departing from the scope of the present disclosure. For example, the designations of different elements in the manner described is meant to help explain concepts described herein and is not limiting. For example, in some embodiments, the sensor driver units 220, the point-cloud aggregator 230, the transformation manager 240, the minimal existence block constructor 250, the heuristic filter 260, and/or the existence detector 270 are delineated in the specific manner described to help with explaining concepts described herein but such delineation is not meant to be limiting and all may be implemented in a single physical device. As another example, the object-detection system 205 may include any number of other elements or may be implemented within other systems or contexts than those described.

Figure 5:
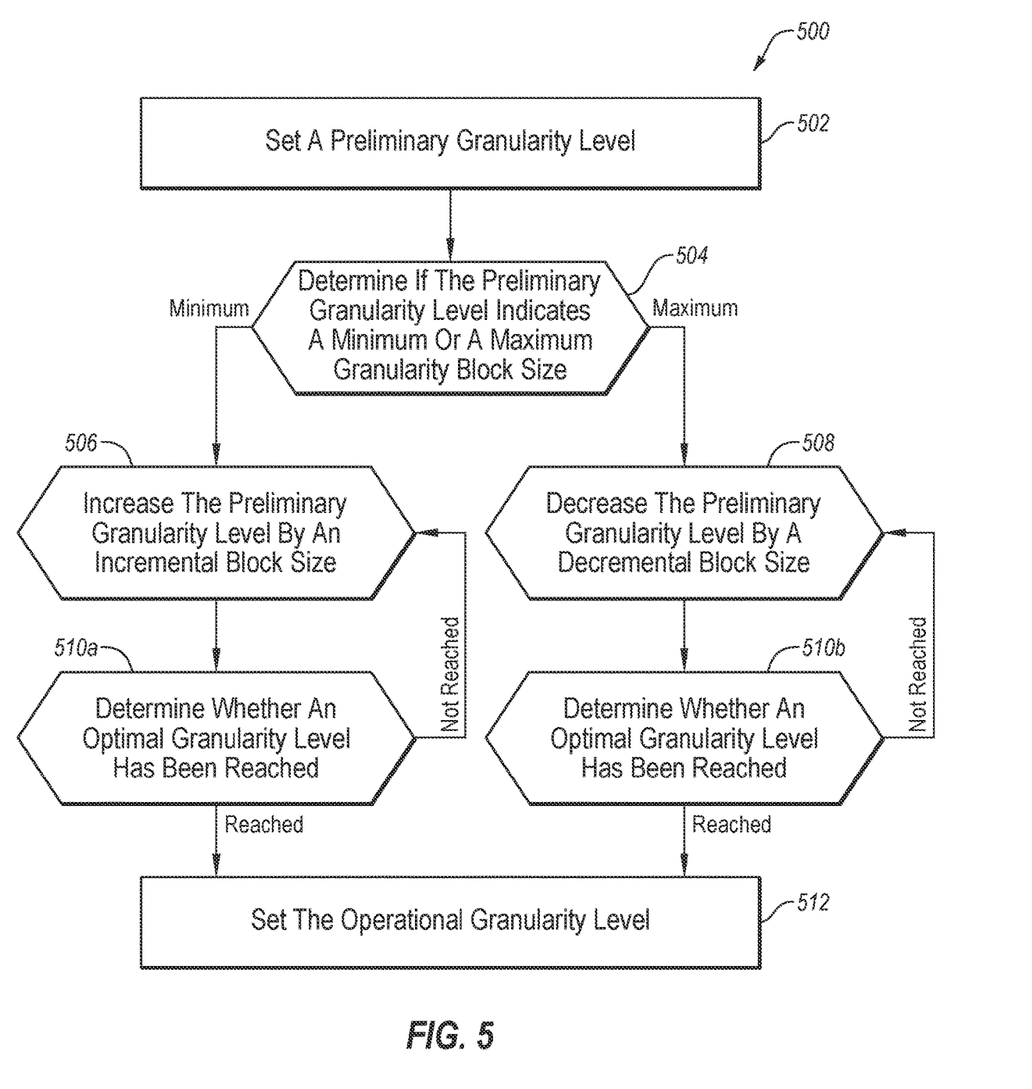
FIG. 5 is a flowchart of an example method of determining the operational granularity level according to at least one embodiment of the present disclosure.

FIG. 5 is a flowchart of the example method 500 of determining the operational granularity level according to at least one embodiment of the present disclosure. The method 500 may be performed by any suitable system, apparatus, or device. For example, the object detection system 205, the sensor driver units 220, the point-cloud aggregator 230, the transformation manager 240, the minimal existence block constructor 250, the heuristic filter 260, and/or the existence detector 270 of FIG. 2 may perform one or more operations associated with the method 500. Although illustrated with discrete blocks, the steps and operations associated with one or more of the blocks of the method 500 may be divided into additional blocks, combined into fewer blocks, or eliminated, depending on the particular implementation.

The method 500 may begin at block 502, where a preliminary granularity level may be set. The preliminary granularity level may be set as a minimum granularity block size or a maximum granularity block size. In some embodiments, the minimum granularity block size may indicate the smallest allowable voxel for generating an array of existence-based objects, such as the array of existence-based objects 275 of FIG. 2, within a given window of time, and the maximum granularity block size may indicate the largest allowable voxel for generating the array of existence-based objects. In some embodiments, the preliminary granularity level may be determined based on computational and/or processing capacity, available memory, or any other computational specifications of the associated computer system if the preliminary granularity level represents a minimum granularity block size. Additionally or alternatively, the preliminary granularity level may be set based on the environment in which an object-detection system, such as the object-detection system 205 of FIG. 2, is operating. Environments that typically include sparser object densities and/or objects with larger sizes (e.g., a highway system, a desert road, or a seaside road) may correspond to larger allowable voxels, while environments that potentially include greater object densities and/or various smaller objects (e.g., neighborhood road systems, parking lots, or warehouses) may correspond to smaller allowable voxels. In these and other embodiments, a user may select the largest allowable voxel, and/or a machine-learning or artificial intelligence system may be configured to determine the largest allowable voxel for a given environment.

At block 504, whether the preliminary granularity level indicates a minimum granularity block size or a maximum granularity block size may be determined. In some embodiments, the preliminary granularity level may be determined to be either a minimum granularity block size or a maximum granularity block size based on a threshold block size. The threshold block size may be set such that any granularity block sizes below the threshold block size are likely to indicate minimum granularity block sizes, while any granularity block sizes above the threshold block size are likely to indicate maximum granularity block sizes.

The method 500 may proceed to block 506 responsive to determining that the preliminary granularity level indicates a minimum granularity block size or to block 508 responsive to determining that the preliminary granularity level indicates a maximum granularity block size.

At block 510a, whether an optimal granularity level has been reached may be determined. In some embodiments, a preliminary granularity level indicating a minimum granularity block size may be increased by an incremental block size. The array of existence-based objects may be generated using the increased granularity block size to assess whether any object-detection problems arise due to the greater granularity block size. Assessing whether object-detection problems have arisen may include determining whether one or more objects included in the array of existence-based objects that were captured at a smaller granularity block size have become indistinct or omitted by increasing the granularity block size. In these and other embodiments, the granularity level may be increased iteratively by the incremental block size until the operational granularity level is reached in which the operational granularity level provides a resolution that allows identification of the objects in the array of existence-based objects without losing information relating to one or more of the objects.

At block 510b, whether an optimal granularity level has been reached may be determined. In some embodiments, a preliminary granularity level indicating a maximum granularity block size may be decreased by a decremental block size. The granularity level may be decreased iteratively by the decremental block size until the operational granularity level is reached. Similar to the minimum granularity block size, an array of existence-based objects may be generated using the decreased granularity block size to assess whether any object-detection problems arise due to the decreased granularity block size. The granularity block size may be iteratively decreased until the operational granularity level is reached in which the operational granularity level provides a resolution that allows identification of the objects in the array of existence-based objects without losing information relating to one or more of the objects.

Responsive to determining that the optimal granularity level has not been reached yet at block 510a or 510b, the method 500 may return to the block 506 or the block 508, respectively. Responsive to determining that the optimal granularity level has been reached at either of blocks 510a or 510b, the operational granularity level may be set at block 512 based on the optimal granularity level having been reached. While the term "optimal" is used herein, it will be appreciated that the term does not necessarily refer to an absolute optimum, or even a regional optimum. Rather, the term conveys performance to a desired or threshold level, for example, performance without losing information relating to one or more of the objects.

The minimum block, the operational granularity level, the preliminary granularity level, the incremental block size, and/or the decremental block size (collectively a "block") may each be based on and/or measured by a unit shape. In some instances, the block may include a square or a rectangular cross-section and a corresponding cube or rectangular prism shape (e.g., a 2 cm×2 cm×2 cm cube). Additionally or alternatively, the block may include any other polygonal cross-section and corresponding three-dimensional shape, such as a hexagonal cross-section (hexagonal prism shape) or a circle (a cylindrical or pillar shape). Additionally or alternatively, the block may include a concave hull or a convex hull.

Modifications, additions, or omissions may be made to the method 500 without departing from the scope of the disclosure. For example, the designations of different elements in the manner described is meant to help explain concepts described herein and is not limiting. Further, the method 500 may include any number of other elements or may be implemented within other systems or contexts than those described.

Figure 6:
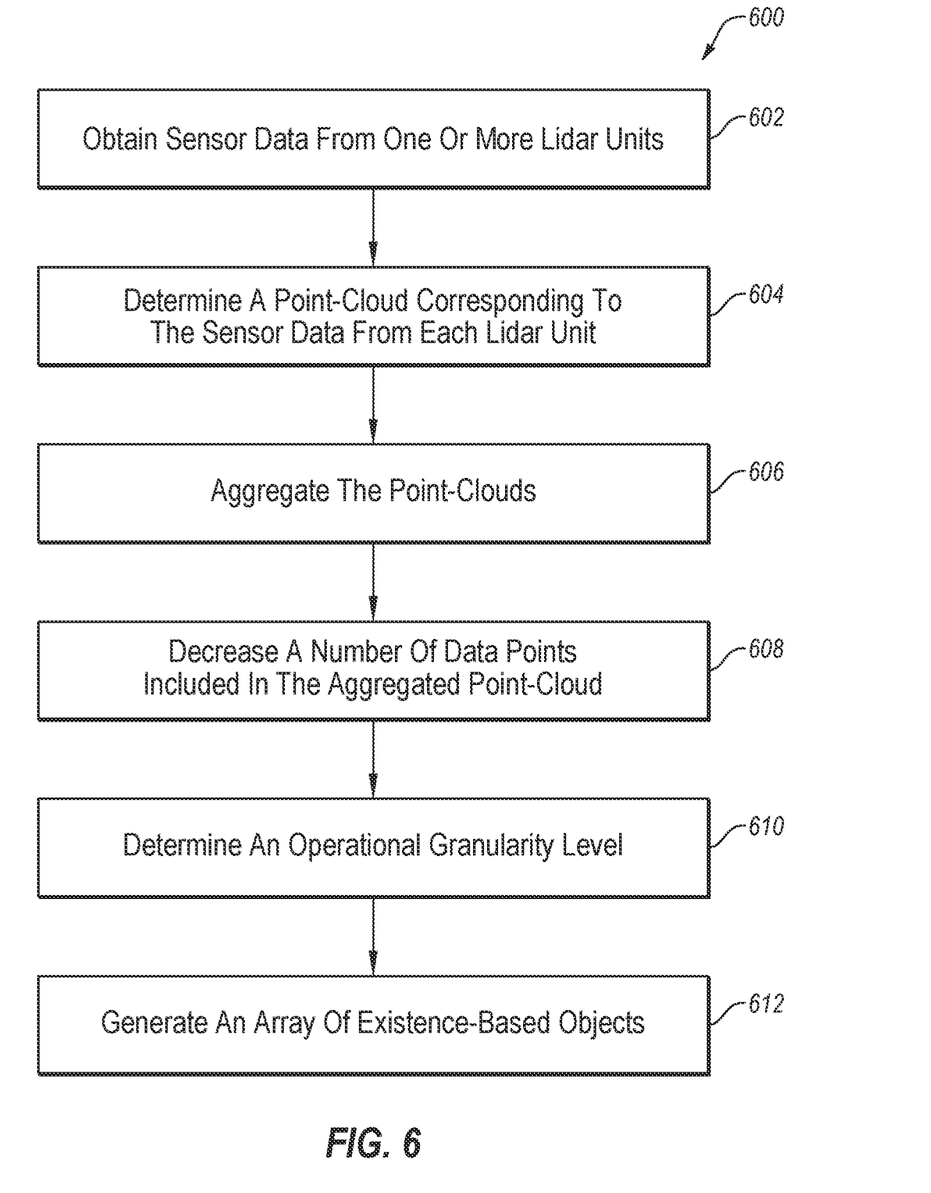
FIG. 6 is a flowchart of an example method of detecting objects according to at least one embodiment of the present disclosure.

FIG. 6 is a flowchart of an example method 600 of detecting objects according to the present disclosure. The method 600 may be performed by any suitable system, apparatus, or device. For example, the object detection system 205, the sensor driver units 220, the point-cloud aggregator 230, the transformation manager 240, the minimal existence block constructor 250, the heuristic filter 260, and/or the existence detector 270 of FIG. 2 may perform one or more operations associated with the method 600. Although illustrated with discrete blocks, the steps and operations associated with one or more of the blocks of the method 600 may be divided into additional blocks, combined into fewer blocks, or eliminated, depending on the particular implementation.

The method 600 may begin at block 602, where sensor data from one or more LiDAR units may be obtained. The LiDAR units may emit pulses of light and capture reflections of the emitted pulses after being reflected by an object in the vicinity of the LiDAR units, and the captured pulse reflections may be represented as discrete, scanned data points.

At block 604, a point-cloud corresponding to the sensor data obtained from each respective LiDAR unit may be determined. As described in relation to the unit-centered point-clouds 225 of FIG. 2, the scanned data points may be represented in terms of the location of the scanned data points relative to a specific LiDAR unit (i.e., using x-, y-, and/or z-position coordinates) and/or in terms of the intensity of the reflected pulses of light.

At block 606, the point-clouds corresponding to each LiDAR unit may be aggregated as an aggregated point-cloud. As described in relation to the point-cloud aggregator 230 and the aggregated point-cloud 235 in relation to FIG. 2, one or more matrix transformations may be applied to the point-clouds corresponding to each LiDAR unit, and the transformed point-clouds may be aggregated (e.g., by concatenating the matrices together) as the aggregated point-cloud.

At block 608, a number of data points included in the aggregated point-cloud may be decreased according to one or more heuristic rules to generate a reduced point-cloud. In some embodiments, decreasing the number of data points included in the aggregated point-cloud may involve removing one or more of the data points according to one or more heuristic rules as described in relation to the heuristic filter 260 and the heuristic rules 265 in relation to FIG. 2. The heuristic rules may pertain to physical constraints of a total measurable world from which the scanned points were detected by the LiDAR units. In these and other embodiments, the heuristic rules may include one or more rules for removing the data points using ground-level detection, boundary-level detection, and/or duplicate scanned point detection.

At block 610, an operational granularity level corresponding to the reduced point-cloud may be determined. The operational granularity level may provide a resolution that allows identification of some or all of the objects in an array of existence-based objects without losing information relating to one or more of the objects. In some embodiments, a preliminary granularity level that indicates a minimum granularity block size may be set based on a computational capacity of a computer system configured to analyze the reduced point-cloud. The preliminary granularity level may be iteratively increased by an incremental block size until reaching the operational granularity level. Additionally or alternatively, the preliminary granularity level may be set to indicate a maximum granularity block size based on the computational capacity of the computer system configured to analyze the reduced point-cloud, and the preliminary granularity level may be iteratively decreased by a decremental block size until reaching the operational granularity level.

At block 612, an array of existence-based objects may be generated based on the reduced point-cloud and the operational granularity level. The array of existence-based objects may represent the objects detected within the total measurable world. The detected objects may be used by an autonomous driving system, such as an autonomous driving system that implements the object-detection system 205, to facilitate operation of and/or navigation by an autonomous vehicle.

Modifications, additions, or omissions may be made to the method 600 without departing from the scope of the disclosure. For example, the designations of different elements in the manner described is meant to help explain concepts described herein and is not limiting. Further, the method 600 may include any number of other elements or may be implemented within other systems or contexts than those described.

Figure 7:
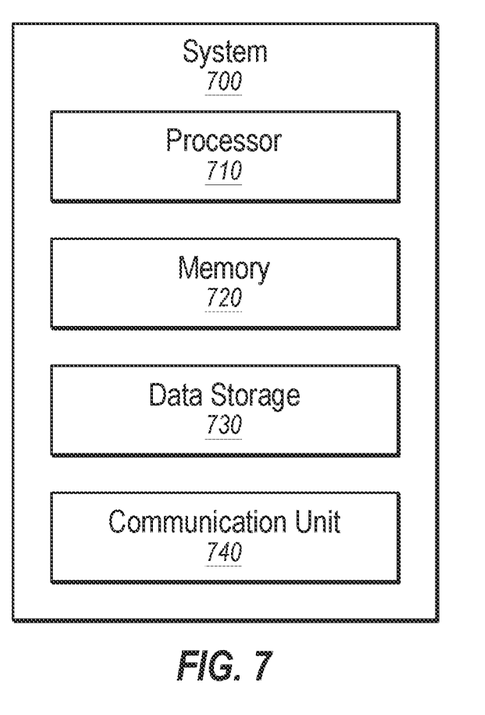
FIG. 7 is an example computing system.

FIG. 7 illustrates an example computing system 700, according to at least one embodiment described in the present disclosure. The computing system 700 may include a processor 710, a memory 720, a data storage 730, and/or a communication unit 740, which all may be communicatively coupled. Any or all of the environment 200, the object-detection system 205 of FIG. 2 may be implemented as a computing system consistent with the computing system 700, including the sensor driver units 220, the point-cloud aggregator 230, the transformation manager 240, the minimal existence block constructor 250, the heuristic filter 260, and/or the existence detector 270.

Generally, the processor 710 may include any suitable special-purpose or general-purpose computer, computing entity, or processing device including various computer hardware or software modules and may be configured to execute instructions stored on any applicable computer-readable storage media. For example, the processor 710 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 7, it is understood that the processor 710 may include any number of processors distributed across any number of network or physical locations that are configured to perform individually or collectively any number of operations described in the present disclosure. In some embodiments, the processor 710 may interpret and/or execute program instructions and/or process data stored in the memory 720, the data storage 730, or the memory 720 and the data storage 730. In some embodiments, the processor 710 may fetch program instructions from the data storage 730 and load the program instructions into the memory 720.

After the program instructions are loaded into the memory 720, the processor 710 may execute the program instructions, such as instructions to perform operations associated with the sensor driver units 220, the point-cloud aggregator 230, the transformation manager 240 the minimal existence block constructor 250, the heuristic filter 260, and/or the existence detector 270. For example, the processor 710 may execute instructions to perform steps associated with the method 400, the method 500, and/or the method 600 of FIGS. 4, 5, and/or 6, respectively.

The memory 720 and the data storage 730 may include computer-readable storage media or one or more computer-readable storage mediums for having computer-executable instructions or data structures stored thereon. Such computer-readable storage media may be any available media that may be accessed by a general-purpose or special-purpose computer, such as the processor 710. For example, the memory 720 and/or the data storage 730 may store obtained LiDAR sensor data, voxel configurations, the heuristic rules 265, and/or the array of detected objects 275. In some embodiments, the computing system 700 may or may not include either of the memory 720 and the data storage 730.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 710 to perform a certain operation or group of operations.

The communication unit 740 may include any component, device, system, or combination thereof that is configured to transmit or receive information over a network. In some embodiments, the communication unit 740 may communicate with other devices at other locations, the same location, or even other components within the same system. For example, the communication unit 740 may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit 740 may permit data to be exchanged with a network and/or any other devices or systems described in the present disclosure. For example, the communication unit 740 may allow the system 700 to communicate with other systems, such as computing devices and/or other networks.

One skilled in the art, after reviewing this disclosure, may recognize that modifications, additions, or omissions may be made to the system 700 without departing from the scope of the present disclosure. For example, the system 700 may include more or fewer components than those explicitly illustrated and described.

The embodiments described in the present disclosure may include the use of a special purpose or general-purpose computer including various computer hardware or software modules. Further, embodiments described in the present disclosure may be implemented using computer-readable media for having computer-executable instructions or data structures stored thereon.

Terms used in the present disclosure and especially in the appended claims (e.g., bodies of the appended claims) are generally intended as "open terms" (e.g., the term "including" should be interpreted as "including, but not limited to.").

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is expressly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase preceding two or more alternative terms, whether in the description, claims, or drawings, should be understood to contemplate the possibilities of including one of the terms, either of the terms, or both of the terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method comprising:
    obtaining sensor data from one or more LiDAR units;
    determining a point-cloud corresponding to the sensor data obtained from each respective LiDAR unit;
    aggregating the point-clouds as an aggregated point-cloud;
    decreasing a number of data points included in the aggregated point-cloud according to one or more heuristic rules to generate a reduced point-cloud
    determining an operational granularity level for the reduced point-cloud by:
        setting a preliminary granularity level that indicates a minimum granularity block size based on a computational capacity of a computer system configured to analyze the reduced point-cloud; and
        iteratively increasing the preliminary granularity level by an incremental block size until reaching the operational granularity level in which the operational granularity level provides a resolution that allows identification of one or more of the existence-based objects in the aggregated point-cloud; and
    generating an array of existence-based objects based on the reduced point-cloud and the operational granularity level.

2. The method of claim 1, wherein the point-cloud corresponding to the sensor data obtained from each respective LiDAR unit is a four-dimensional matrix that includes x-position information, y-position information, z-position information, and reflection intensity information relating to each scanned point detected by the LiDAR units.

3. The method of claim 2, wherein aggregating the point-clouds as the aggregated point-cloud includes:
    performing one or more first matrix transformations to scale the four-dimensional matrix corresponding to each respective point-cloud; and
    performing one or more second matrix transformations to rotate one or more four-dimensional matrices scaled by the first matrix transformations.

4. The method of claim 2, wherein decreasing the number of data points included in the aggregated point-cloud according to the heuristic rules includes removing one or more data points corresponding to respective scanned points based on physical constraints relating to an environment from which the scanned points were detected by the LiDAR units.

5. The method of claim 4, wherein the heuristic rules include one or more rules for removing the data points based on at least one of the following: ground-level detection, boundary-level detection, and duplicate scanned point detection.

6. The method of claim 1, further comprising determining an operational granularity level for the reduced point-cloud, wherein generating the array of existence-based objects is based on the operational granularity level and determining the operational granularity level for the reduced point-cloud includes:
    setting a preliminary granularity level that indicates a maximum granularity block size based on a computational capacity of a computer system configured to analyze the reduced point-cloud; and
    iteratively decreasing the preliminary granularity level by a decremental block size until reaching the operational granularity level in which the operational granularity level provides a resolution that allows identification of one or more of the existence-based objects in the aggregated point-cloud.

7. One or more non-transitory computer-readable storage media configured to store instructions that, in response to being executed, cause a system to perform operations, the operations comprising:
    obtaining sensor data from one or more LiDAR units;
    determining a point-cloud corresponding to the sensor data obtained from each respective LiDAR unit;
    aggregating the point-clouds as an aggregated point-cloud;
    decreasing a number of data points included in the aggregated point-cloud according to one or more heuristic rules to generate a reduced point-cloud
    determining an operational granularity level for the reduced point-cloud by:
        setting a preliminary granularity level that indicates a minimum granularity block size based on a computational capacity of a computer system configured to analyze the reduced point-cloud; and
        iteratively increasing the preliminary granularity level by an incremental block size until reaching the operational granularity level in which the operational granularity level provides a resolution that allows identification of one or more of the existence-based objects in the aggregated point-cloud; and generating an array of existence-based objects based on the reduced point-cloud and the operational granularity level.

8. The one or more non-transitory computer-readable storage media of claim 7, wherein the point-cloud corresponding to the sensor data obtained from each respective LiDAR unit is a four-dimensional matrix that includes x-position information, y-position information, z-position information, and reflection intensity information relating to each scanned point detected by the LiDAR units.

9. The one or more non-transitory computer-readable storage media of claim 8, wherein aggregating the point-clouds as the aggregated point-cloud includes:

performing one or more first matrix transformations to scale the four-dimensional matrix corresponding to each respective point-cloud; and performing one or more second matrix transformations to rotate one or more four-dimensional matrices transformed scaled by the first matrix transformations.

10. The one or more non-transitory computer-readable storage media of claim 8, wherein decreasing the number of data points included in the aggregated point-cloud according to the heuristic rules includes removing one or more data points corresponding to respective scanned points based on physical constraints relating to an environment from which the scanned points were detected by the LiDAR units.

11. The one or more non-transitory computer-readable storage media of claim 8, wherein:

decreasing the number of data points included in the aggregated point-cloud according to the heuristic rules includes removing one or more data points corresponding to respective scanned points based on physical constraints relating to an environment from which the scanned points were detected by the LiDAR units; and the heuristic rules include one or more rules for removing the data points based on at least one of the following: ground-level detection, boundary-level detection, and duplicate scanned point detection.

12. The one or more non-transitory computer-readable storage media of claim 7, further comprising determining an operational granularity level for the reduced point-cloud, wherein generating the array of existence-based objects is based on the operational granularity level and determining the operational granularity level for the reduced point-cloud includes:

setting a preliminary granularity level that indicates a maximum granularity block size based on a computational capacity of a computer system configured to analyze the reduced point-cloud; and iteratively decreasing the preliminary granularity level by a decremental block size until reaching the operational granularity level in which the operational granularity level provides a resolution that allows identification of one or more of the existence-based objects in the aggregated point-cloud.

13. A system, comprising:
one or more processors; and one or more non-transitory computer-readable storage media configured to store instructions that, in response to being executed, cause the system to perform operations, the operations comprising:

obtaining sensor data from one or more LiDAR units;

determining a point-cloud corresponding to the sensor data obtained from each respective LiDAR unit;

aggregating the point-clouds as an aggregated point-cloud;

decreasing a number of data points included in the aggregated point-cloud according to one or more heuristic rules to generate a reduced point-cloud determining an operational granularity level for the reduced point-cloud by:

setting a preliminary granularity level that indicates a minimum granularity block size based on a computational capacity of a computer system configured to analyze the reduced point-cloud; and iteratively increasing the preliminary granularity level by an incremental block size until reaching the operational granularity level in which the operational granularity level provides a resolution that allows identification of one or more of the existence-based objects in the aggregated point-cloud; and generating an array of existence-based objects based on the reduced point-cloud and the operational granularity level.

14. The system of claim 13, wherein the point-cloud corresponding to the sensor data obtained from each respective LiDAR unit is a four-dimensional matrix that includes x-position information, y-position information, z-position information, and reflection intensity information relating to each scanned point detected by the LiDAR units.

15. The system of claim 14, wherein aggregating the point-clouds as the aggregated point-cloud includes:

performing one or more first matrix transformations to scale the four-dimensional matrix corresponding to each respective point-cloud; and performing one or more second matrix transformations to rotate one or more four-dimensional matrices transformed scaled by the first matrix transformations.

16. The system of claim 14, wherein decreasing the number of data points included in the aggregated point-cloud according to the heuristic rules includes removing one or more data points corresponding to respective scanned points based on physical constraints relating to an environment from which the scanned points were detected by the LiDAR units.

17. The system of claim 14, wherein:

decreasing the number of data points included in the aggregated point-cloud according to the heuristic rules includes removing one or more data points corresponding to respective scanned points based on physical constraints relating to an environment from which the scanned points were detected by the LiDAR units; and the heuristic rules include one or more rules for removing the data points based on at least one of the following: ground-level detection, boundary-level detection, and duplicate scanned point detection.

* * * * *